May 7, 1968  K. RÄNTSCH ET AL  3,382,370

TWO-STAGE READING DEVICE FOR LENGTH AND ANGLE MEASURING SCALES

Filed July 9, 1964  2 Sheets-Sheet 1

INVENTORS.
KURT RANTSCH
HEINRICH STAADEN

BY *Toulmin & Toulmin*

ATTORNEYS

United States Patent Office 3,382,370
Patented May 7, 1968

3,382,370
TWO-STAGE READING DEVICE FOR LENGTH
AND ANGLE MEASURING SCALES
Kurt Räntsch, Heidenheim (Brenz), and Heinrich Staaden, Braunfels, near Wetzlar, Germany, assignors to M. Hensoldt & Söhne, Optische Werke Aktiengesellschaft, Wetzlar, Germany
Filed July 9, 1964, Ser. No. 381,464
Claims priority, application Germany, July 9, 1963, H 49,675
8 Claims. (Cl. 250—237)

ABSTRACT OF THE DISCLOSURE

An apparatus in a machine tool for the measurement of the displacement of a slidable carriage in a pre-determined direction and having first and second units with each unit including a coarse register and a fine register wherein one unit is continuously driven to measure the displacement from absolute zero and the other unit is resettable to zero positions for measurements from various zero positions with said units also being reversible so as to indicate positive displacement measurements for either direction of movement of the slide.

---

This invention relates to indicating devices, particularly for indicating linear or angular movement in connection with, for example, machine tool elements along a supporting slide.

Indicating devices for indicating linear or angular travel of machine tool elements or the like are known, and one such known device comprises a 2-stage indicating device having two counters of the intermittent type, which counters have numbered wheels thereon and with one of the counters indicating coarse values and the other counter indicating fine values. A 2-stage counter of this nature is inexpensive and is easily read and can be easily installed on a machine tool. One such device is disclosed in copending application Ser. No. 333,507 filed December 26, 1963.

The counter operates by a driving arrangement which drives the coarse counter as the movable element moves along the support. The fine measurement counter is then operated by bringing it into register with a printed scale or the like by manual adjustment, and adjustment of the fine counter is also operable for influencing at least the digit wheel of the coarse counter.

While such measuring or counting devices are reliable and widely used; they are defective in respect of certain indications that might be valuable in connection with the operation of a machine tool. For example, if a plurality of successive movements of a movable element of a machine tool is to be made, it is convenient always to start the movement with the count indicating device set to zero. Setting of the counter to zero, however, will lose the absolute zero position at which movement of the movable element was started.

Furthermore, it is sometimes desirable to have an indication of the distance yet remaining for the movable element to travel up to a certain point. This indication can best be accomplished by a counter or indicating device running in reverse direction.

With the foregoing in mind, it is a primary object of the present invention to provide a counting or travel indicating mechanism of the nature referred to which overcomes these drawbacks.

Another object of this invention is to provide a double counting or indicating mechanism so that one part of the mechanism can always indicate with respect to an absolute zero position of the movable element, while the other counter can be reset at any time to zero and which can also be run in reverse.

Still another object of this invention is the provision of a dual counting or travel indicating mechanism with a sliding carriage or the like of a machine tool, in which the individual counting mechanisms are relatively simple and inexpensive, but which mechanism is adapted for counting either forwardly or backwardly, or for counting from any given position to any other given position in either direction without ever losing the indication of the position of the sliding carriage with respect to a pre-determined absolute zero position.

Other objects and advantages of the present invention will be apparent upon reference to the accompanying description when taken in conjunction with the following drawings, wherein.

Figure 1:
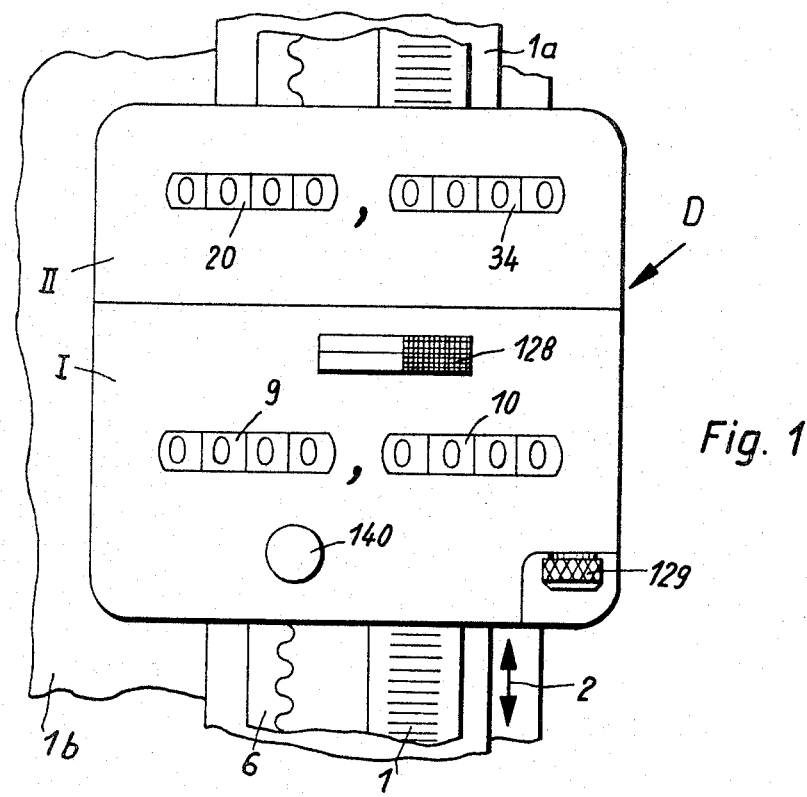
FIGURE 1 is a somewhat schematic elevational view of a device according to the present invention, as is appears when mounted on a movable element.

In general, the present invention is concerned with the provision of two counting or read-out or travel indicating devices in parallel, with one only of the devices including means for returning it to a zero setting in any position of the movable element on which it is mounted, and the same one of the devices also including means for causing it to operate in either the forward or reverse direction. Complete control of the second or auxiliary device is effected quite simply through bevel gear groups effecting driving connection between the two devices and which can be shifted in unison for one direction of rotation of the second device, or the other direction of rotation thereof.

Referring to the drawings in somewhat more detail, a movable element, such as the movable carriage of a machine tool or the like is schematically indicated at 1a and has mounted thereon a measuring scale 1 for movement with the carriage in the direction of the double arrow 2. The scale 1 is provided with indicia that can be optically observed as will be explained hereinafter. Carriage 1a is slidably supported on a bed or the like 1b of the machine tool. Bed 1b carries the device of the present invention, indicated generally at D, and which is, essentially, a counting mechanism or read-out device consisting of two individual counting mechanisms I and II.

In counter I, the wheels generally indicated at 9 register the coarse values of travel of carriage 1a, while in this same counter the wheels 10 register the fine values of movement of the carriage. In part II of the indicating device, the numbered wheels at 20 show the coarse values, while the numbered wheels at 34 show the fine values. A resetting knob 140 is operable for resetting part II of the indicating device to zero at any time.

FIGURE 1 will also show that carriage 1a carries a rack 6 that operates the coarse portion of the counting mechanism.

FIGURE 1 also shows the location of a magic eye indicator 128 that cooperates with the adjustment for the fine counting mechanism and which is under the control of the manual adjustment element 129.

Figure 2:
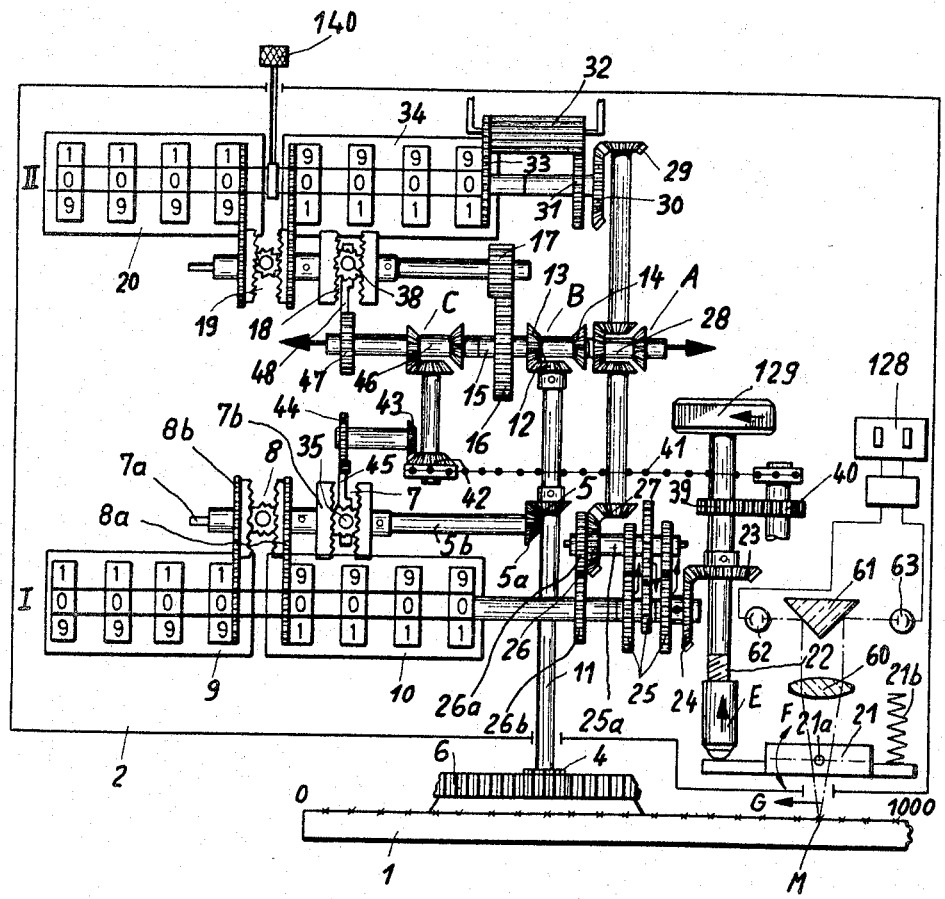
FIGURE 2 is a schematic view showing the operative components of the device according to the present invention.

Turning now to FIGURE 2, it will be seen that rack 6 which is stationary with respect to scale 1, engages pinion 4 mounted on shaft 11. Shaft 11 drives through bevel gears 5 and 5a into shaft 5b on which is mounted the input bevel gear of the differential unit or planetary gearing 7. The output bevel gear 7b of differential unit 7 is fixed to shaft 7a which extends through a second differential unit 8 and is fixed to the planet carrier of differential unit 8. Differential unit 8 has one gear 8a meshing with a corresponding gear on the highest valued wheel of fine counter 10, and has another gear 8b meshing with a corresponding gear on the digit wheel of coarse counter 9.

Figure 3:
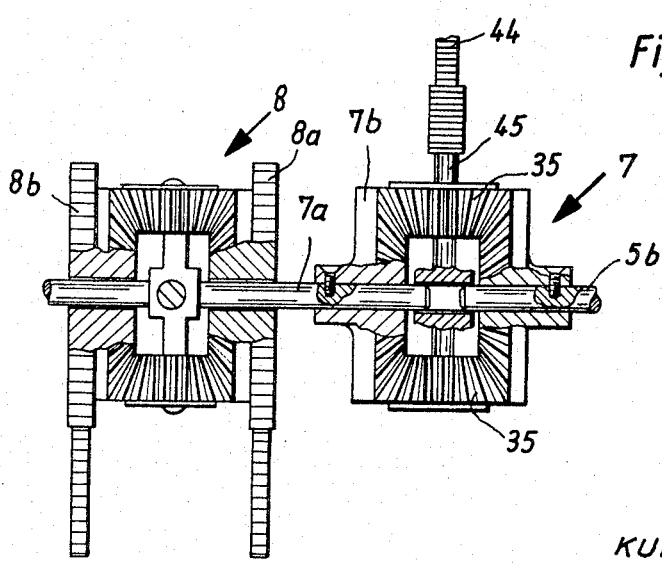
FIGURE 3 is a section through the differential units pertaining to one of the counter devices.

The differential unit or planetary gearing 7 includes planet pinion means 35 on carrier 45 which includes a gear sector 45a in mesh with a gear 44 for the purpose described hereinafter. The serial arrangements of the two differential units 7 and 8 is similar to the corresponding differential units in my copending application referred to above, and is somewhat diagrammatically illustrated in FIGURE 3 of the drawings herein.

Shaft 11 also drives through bevel gears 12 and 13 into the input side of another differential 18, the output side of which is connected to the input side of still another differential unit 19 having gears meshing with the highest value wheel of fine counter 34 and with the digit wheel of counter 20. The two counters referred to are thus driven in unison and in the same manner.

Bevel gears 12 and 13 are part of a group of bevel gears B that also include bevel gears 14. This gear group, together with other bevel gear groups A and C, forms reversing means that can be reversed by shifting the aligned supporting shafts for the bevel gears, as indicated by the double arrows thereon.

The operation of the coarse counters, it is believed, will be evident from the foregoing description and it is believed that it will be apparent that coarse counter 20 can be operated in either the forward or reverse direction. The counter 20, as well as fine counter 34 associated therewith, is resettable to zero at any time in any conventional manner by means of the aforementioned knob 140. During this resetting the counters can be disengaged from the drive mechanism therefor or may be provided with over-running clutches in the case of counter 20. Counter 34, which is reversely adjustable, preferably includes a drive gear 32 forming the driving connection between input 31 and gear 33 on the lower valued wheel of fine counter 34 so that the said gear 32 can be disengaged thereby to permit of setting of fine counter 34 to zero.

With regard to the fine measurement, the image of a graduation mark M of scale 1 is projected through flat glass plate 21 and lens 60 to a double prism 61 where the beam is split and passes to photocells 62 and 63 which are connected in circuit with magic eye 128.

Plate 21 is biased in one direction about a pivot axis 21a by a spring 21b and is adjustable as to position by movement of an abutment element E by screw 22 which is rotatable by the aforementioned knob 129. Tilting of the plate 21 will cause the photocells to be illuminated equally and in this manner the exact position of the reading device with reference to the respective scale mark can be determined.

The actuation of the counting mechanism in response to adjustment of screw 22 by knob 129 as effected through bevel gears 23 and 24 and the compound gearing 25 which drives a shaft 25a having mounted thereon a bevel gear 26 and also a spur gear 26a which meshes with a spur gear 26b on the input shaft for fine counter 10 of part I of the device.

Bevel gear 26 meshes with gear 27 that drives through the reversing bevel gear at A carried by shaft 28 to a bevel gear 29 that meshes with a bevel gear 30 that is connected with the aforementioned gear 31 that drives via gears 32 and 33 into the input end of fine counter 34.

Rotation of screw 22 is also conveyed by gearing 39 and 40 and chain 41 to a shaft that has mounted thereon a bevel gear 42 meshing with bevel gear 43 that is in mesh with a gear sector 45a formed on the carrier 45 of planetary gearing 7. The carrier 45 carries the planet pinion means 35 of planetary gearing 7.

Bevel gear 42 is also connected with the input bevel gear of the bevel gear group C which is arranged for reversibly driving shaft 46 on which is mounted gear 47 meshing with a gear sector formed on carrier 48 of planetary gearing 18 pertaining to part II of the device. Carrier 48 carries the plant pinion means 38 of planetary gearing 18. The carriers for the differentials or planetary gearing at 8 and 19 are, of course, rotatable.

From the foregoing it will be seen that counter 9 of part I of the device is always directly drivingly connected with rack 6, and therefore, once set to zero at a predetermined absolute zero position of carriage 1a, will always indicate the distance of the carriage 1a from the said absolute zero position. This is the case for linear movement of carriage 1a or the counter can be arranged to indicate angular movement of element 1a from a predetermined position.

Fine measurements are obtained by adjusting knob 129 until the magic eye 128 indicates equal illumination of photocells 62 and 63. The adjustment of knob 129 is conveyed to fine counter 10 while simultaneously a corresponding adjustment of the position of the digit wheel of coarse counter 9 is also effected.

It will also be evident that part II of the device consisting of coarse counter 20 and fine counter 34 will be actuated simultaneously with counters 9 and 10 of part I of the device. However, counters 20 and 34 can be made to run in either forward or reverse direction or can be set to zero at any time so that the counting device at once becomes much more versatile and useful than heretofore known counting devices which could not arbitrarily be set to zero in any position of the carriage, and which could not be run in both forward and reverse directions while at the same time maintaining reference to an absolute zero position.

It will be understood that this invention is susceptible to modificaiton in order to adapt it to different usages and conditions and, accordingly, it is desired to comprehend such modifications within this invention as may fall within the scope of the appended claims.

What is claimed is:

1. In a machine tool having a carriage slidably mounted on a base and displaceable in a predetermined direction, an apparatus for measuring displacement from both absolute zero and resettable zero positions and comprising a graduated scale on said base along the direction of displacement, a first unit for indicating digitally the amount of displacement of said carriage and comprising a coarse digital register and a fine digital register, means operatively connected to said movable carriage for continuously driving said coarse register in response to the displacement of said carriage, adjustable means cooperating with said scale and operatively connected to said fine register for driving said fine register to conform with the displacement of said carriage of a fraction of an interval along said scale, a second unit for indicating digitally the amount of displacement of said carriage and comprising a second coarse digital register and a second fine digital register, selectively reversible means for drivingly interconnecting said first and second coarse registers and said first and second fine registers with each other whereby both counters are driven by the same driving means, and means on said second unit for resetting said second coarse register to zero regardless of the relative position of the movable carriage.

2. A device according to claim 1, and further comprising fifth means for connecting said adjustable means to said coarse counters for adjustment thereof in conformity with the adjustment of said fine counters but in the opposite direction.

3. A device according to claim 2, wherein said interconnecting means comprises a reversible driving connection between said coarse counters, a reversible driving connection between said fine counters, and a reversible driving connection in said fifth means between said adjustable means and the coarse counter of said second unit.

4. A device according to claim 3, and further comprising means for shifting all of said reversible driving connections in unison.

5. A device according to claim 4, in which each said reversible driving connection comprises an input bevel gear and a pair of output bevel gears shiftable alternately into mesh with the input bevel gear from respectively opposite sides thereof.

6. A device according to claim 1, wherein each said register comprises a multi-roll digital counter and the said driving connections to said registers being to the lowest valued wheel of the respective registers.

7. A device according to claim 1, wherein said adjustable means includes a pair of light sensitive cells, a beam dividing element between the cells, a condensing lens between the dividing element and the scale, and a movable beam deflector between the lens and the scale, means in circuit with said cells for indicating a condition of equal illumination thereof, a manually adjustable member for adjusting said beam deflector, and a driving connection from said adjustable member to said fine registers.

8. In an apparatus for measuring displacement from both absolute zero and resettable zero positions, the combination of a machine tool having a base and a movable carriage slidably mounted on said base and displaceable in a predetermined direction, a graduated scale on said base along the direction of displacement, first means for indicating digitally the amount of displacement of said carriage with respect to fractions of an interval along said scale, means operatively connected to said first indicating means for driving said indicating means in response to the displacement of said carriage with respect to said scale, second means for indicating digitally the amount of displacement of said carriage with respect to fractions of an interval along said scale, selectively reversible means for drivingly interconnecting said first and second indicating means whereby both indicating means are driven by the same driving means, and means on said second indicating means for resetting said second indicating means to zero regardless of the relative position of the movable carriage.

References Cited

UNITED STATES PATENTS

| | | | |
|---|---|---|---|
| 2,916,961 | 12/1959 | Schwidefsky | 88—14 |
| 2,980,328 | 4/1961 | Jacobson et al. | 235—136 |
| 3,068,741 | 12/1962 | Werner | 250—237 |
| 3,188,647 | 6/1965 | Davis | 235—97 |

RALPH G. NILSON, *Primary Examiner.*

M. A. LEAVITT, J. D. WALL, *Assistant Examiners.*